(12) United States Patent
Takiguchi et al.

(10) Patent No.: US 10,107,501 B2
(45) Date of Patent: Oct. 23, 2018

(54) COMBUSTOR AND GAS TURBINE

(71) Applicant: MITSUBISHI HEAVY INDUSTRIES, LTD., Tokyo (JP)

(72) Inventors: Satoshi Takiguchi, Tokyo (JP); Mitsunori Isono, Tokyo (JP); Atsushi Yuasa, Tokyo (JP); Eisaku Ito, Tokyo (JP); Shigemi Mandai, Hyogo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 313 days.

(21) Appl. No.: 14/777,685

(22) PCT Filed: Mar. 19, 2014

(86) PCT No.: PCT/JP2014/057580
§ 371 (c)(1),
(2) Date: Sep. 16, 2015

(87) PCT Pub. No.: WO2014/148567
PCT Pub. Date: Sep. 25, 2014

(65) Prior Publication Data
US 2016/0273776 A1 Sep. 22, 2016

(30) Foreign Application Priority Data
Mar. 21, 2013 (JP) .................. 2013-058671

(51) Int. Cl.
*F23R 3/54* (2006.01)
*F23R 3/14* (2006.01)
(Continued)

(52) U.S. Cl.
CPC .................. *F23R 3/54* (2013.01); *F02C 3/04* (2013.01); *F02C 3/145* (2013.01); *F02C 7/18* (2013.01);
(Continued)

(58) Field of Classification Search
CPC ...... F23R 3/54; F23R 3/56; F23R 3/58; F23R 3/60; F23R 3/14; F23R 3/20; F23R 3/24;
(Continued)

(56) References Cited

U.S. PATENT DOCUMENTS 5,640,841 A * 6/1997 Crosby .................. F02C 7/264
219/121.54
6,047,551 A * 4/2000 Ishiguro .................. F23R 3/286
60/740

(Continued)

FOREIGN PATENT DOCUMENTS

CN 101023302 8/2007
CN 101793407 8/2010
(Continued)

OTHER PUBLICATIONS

Office Action dated May 20, 2016 in Chinese patent application No. 201480015877.6 (with English translation).

(Continued)

*Primary Examiner* — Craig Kim
(74) *Attorney, Agent, or Firm* — Wenderoth, Lind & Ponack, L.L.P.

(57) ABSTRACT

An object is to realize combustion flame which can further reduce the amount of NOx generation. A combustor (14) includes a pilot nozzle (40); a plurality of main nozzles (44) arranged apart from the pilot nozzle (40) in the circumferential direction on the outer peripheral side of the pilot nozzle (40) and configured to perform premix combustion; a combustor basket (34) surrounding the pilot nozzle (40) and each main nozzle (44); an outlet outer ring (50) provided at a tip end of the combustor basket (34); and a combustion liner (36) fitted, at an inner surface thereof, onto the outer periphery of the combustor basket (34) and surrounding the outlet outer ring (50). The outlet outer ring (50) is formed (Continued)

parallel to an inner wall surface (66) of the combustion liner (36).

10 Claims, 10 Drawing Sheets

(51) Int. Cl.
| | |
|---|---|
| *F23R 3/06* | (2006.01) |
| *F23R 3/28* | (2006.01) |
| *F23C 9/00* | (2006.01) |
| *F23M 20/00* | (2014.01) |
| *F23R 3/34* | (2006.01) |
| *F23R 3/44* | (2006.01) |
| *F02C 3/04* | (2006.01) |
| *F02C 3/14* | (2006.01) |
| *F02C 7/18* | (2006.01) |
| *F02C 7/24* | (2006.01) |
| *F23R 3/20* | (2006.01) |
| *F23R 3/24* | (2006.01) |

(52) U.S. Cl.
CPC ............... *F02C 7/24* (2013.01); *F23C 9/006* (2013.01); *F23M 20/005* (2015.01); *F23R 3/06* (2013.01); *F23R 3/14* (2013.01); *F23R 3/20* (2013.01); *F23R 3/24* (2013.01); *F23R 3/286* (2013.01); *F23R 3/34* (2013.01); *F23R 3/343* (2013.01); *F23R 3/44* (2013.01); *F05D 2220/32* (2013.01); *F23R 2900/00014* (2013.01); *F23R 2900/00015* (2013.01); *F23R 2900/03042* (2013.01); *Y02T 50/675* (2013.01)

(58) Field of Classification Search
CPC .... F23R 3/34; F23R 3/343; F23R 3/44; F23R 3/286; F02C 3/04; F02C 7/18; F02C 7/24
See application file for complete search history.

(56) References Cited

U.S. PATENT DOCUMENTS

| | | | |
|---|---|---|---|
| 6,272,840 B1* | 8/2001 | Crocker | F02C 7/22 239/404 |
| 7,007,479 B2 | 3/2006 | Held et al. | |
| 2001/0042375 A1 | 11/2001 | Nishida et al. | |
| 2004/0163392 A1 | 8/2004 | Nishida et al. | |
| 2007/0119183 A1 | 5/2007 | Evulet | |
| 2007/0199327 A1* | 8/2007 | Tanimura | F23R 3/04 60/740 |
| 2008/0041058 A1* | 2/2008 | Johnson | F23R 3/286 60/725 |
| 2010/0180602 A1 | 7/2010 | Johnson et al. | |
| 2012/0304649 A1 | 12/2012 | Matsuyama et al. | |
| 2013/0037345 A1 | 2/2013 | Wang et al. | |
| 2013/0055720 A1* | 3/2013 | Fox | F02C 7/222 60/746 |
| 2013/0098063 A1 | 4/2013 | Mizukami et al. | |
| 2013/0219897 A1* | 8/2013 | Nakamura | F02C 7/222 60/737 |

FOREIGN PATENT DOCUMENTS

| | | |
|---|---|---|
| JP | 6-213447 | 8/1994 |
| JP | 6-257750 | 9/1994 |
| JP | 8-14565 | 1/1996 |
| JP | 2003-14232 | 1/2003 |
| JP | 2003-343838 | 12/2003 |
| JP | 2005-171894 | 6/2005 |
| JP | 2007-147125 | 6/2007 |
| JP | 3924136 | 6/2007 |
| JP | 2010-164299 | 7/2010 |
| JP | 2012-77660 | 4/2012 |
| JP | 2012-251741 | 12/2012 |
| JP | 2013-36464 | 2/2013 |

OTHER PUBLICATIONS

Notice of Allowance dated Oct. 4, 2016 in Korean patent application No. 2015-7024498.
Office Action dated Jan. 20, 2017 in corresponding Chinese patent application No. 201480015877.6 (with English translation).
International Search Report dated Apr. 28, 2014 in International Application No. PCT/JP2014/057580.
Written Opinion of the International Searching Authority dated Apr. 28, 2014 in International Application No. PCT/JP2014/057580.
Office Action dated Jun. 10, 2016 in Korean patent application No. 2015-7024498 (with English translation).
Decision to Grant a Patent dated Aug. 9, 2016 in Japanese patent application No. 2013-058671.

* cited by examiner

COMBUSTOR AND GAS TURBINE

TECHNICAL FIELD

The present invention relates to a combustor and a gas turbine.

BACKGROUND ART

It has been required for combustors used for, e.g., gas turbines to reduce the generation of NOx (nitrogen oxide).

As described in PTL 1, premixed gas generated at a pre-mixing main nozzle is supplied to a combustor.

FIG. 10 is an example of a configuration diagram of a conventional combustor 100. The combustor 100 is configured such that a ring (hereinafter referred to as an "outlet outer ring") 102 in an outward conical shape (also referred to as a "tapered shape" or an "enlarged conical shape") is provided at a tip end of a combustor basket 103 in order to prevent oscillatory combustion. Moreover, in the combustor 100, premixed gas blown from a pilot burner 104 and a main burner 106 is guided along an inner wall surface 110 of a combustion liner 108 by the outlet outer ring 102.

Further, in the conventional combustor 100, part of compressed air is, as film air, supplied through the outer periphery of the outlet outer ring 102 and film air discharge holes 112 formed at the inner wall surface 110 of the combustion liner 108. In the combustor 100, a premixed gas concentration in the vicinity of the inner wall surface 110 is diluted with film air. Thus, premixed gas having reached the inner wall surface 110 of the combustion liner 108 is suppressed from combusting in the vicinity of the inner wall surface 110 of the combustion liner 108.

CITATION LIST

Patent Literature

{PTL 1}
Japanese Unexamined Patent Application, Publication No. 2005-171894

SUMMARY OF INVENTION

Technical Problem

In order to prevent combustion of premixed gas in the vicinity of an inner wall surface of a combustion liner, a premixed gas concentration needs to be equal to or lower than a flammability limit. However, in order to reduce NOx, compressed air is more preferably used for mixing with fuel than being used as film air. For this reason, in a combustor, the volume of film air to be supplied cannot be sufficiently increased, and the volume of compressed air which can be used as film air is limited. This may lead to premixed gas combustion starting from the vicinity of a downstream end of an outlet outer ring, as well as premixed gas combustion in the vicinity of the inner wall surface of the combustion liner.

If premixed gas begins combusting from an upstream region of the combustor such as the vicinity of the downstream end of the outlet outer ring, a retention time until high-temperature combustion gas reaches an outlet of the combustor increases. In proportion to the retention time of the combustion gas, the amount of NOx generation increases. For this reason, a short retention time of combustion gas is preferable in order to reduce NOx.

The amount of NOx generation increases with an increase in the flame temperature of combustion gas.

Although primary mixing of premixed gas is performed at a main burner, mixing of such gas is, even after the gas exits from the main burner, continuously promoted until combustion. Accordingly, a fuel concentration becomes more uniform toward the downstream side of the combustor, and therefore, the highest flame temperature of combustion gas decreases. That is, in order to reduce NOx, combustion is preferably performed after mixing is completed. Combustion after completion of mixing results in shortening of the retention time of combustion gas, and therefore, the amount of NOx generation is further reduced. On the other hand, mixing of premixed gas becomes less sufficient toward the upstream side (a head) of the combustor, and therefore, the fuel concentration is not uniform. With combustion on a more upstream side of the combustor, the highest flame temperature is higher, and the retention time of high-temperature combustion gas is longer. Accordingly, the amount of NOx generation increases.

With combustion of more premixed gas on the upstream side of the combustor, i.e., the head of the combustor, the high-temperature region of the inner wall surface of the combustion liner is larger. Since it is required to increase the volume of film air used for increasing the amount of heat for cooling the inner wall surface of the combustion liner, the volume of air for combustion decreases. Alternatively, since the amount of heat exchange with a cooling medium increases, a temperature decreases. For this reason, it is required to increase the outlet gas temperature of the combustor. As a result, the tendency shows that the amount of NOx generation increases.

The present invention has been made in view of the foregoing situation, and is intended to provide a combustor and a gas turbine realizing combustion flame which can further reduce the amount of NOx generation.

Solution to Problem

In order to solve the above-described problem, the combustor and the gas turbine of the present invention employ the following solutions.

A combustor of an aspect of the present invention includes a pilot nozzle; a plurality of main nozzles arranged apart from the pilot nozzle in the circumferential direction on the outer peripheral side of the pilot nozzle and configured to perform premix combustion; a combustor basket surrounding the pilot nozzle and each main nozzle; a ring provided at a tip end of the combustor basket; and a combustion liner fitted, at an inner surface thereof, onto the outer periphery of the combustor basket and surrounding the ring. The ring is formed parallel to an inner wall surface of the combustion liner, or is formed such that the inner diameter thereof decreases toward the downstream side of the flow of premixed gas.

The combustor of the present configuration includes the pilot nozzle and the plurality of main nozzles arranged apart from the pilot nozzle in the circumferential direction on the outer peripheral side of the pilot nozzle and configured to perform premix combustion. Moreover, the combustor of the present configuration further includes the combustor basket surrounding the pilot nozzle and each main nozzle, the ring provided at the tip end of the combustor basket, and the combustion liner fitted, at the inner surface thereof, onto the outer periphery of the combustor basket and surrounding the ring.

For mixing and flame holding, the premixed gas of fuel from the main nozzle and air generates a swirling flow. For this reason, such premixed gas tends to flow and combust on the inner wall surface side of the combustion liner. Thus, in the present configuration, the ring is does not formed in a conventional conical shape, but is formed in the shape parallel to the inner wall surface of the combustion liner or in such a shape that the inner diameter thereof decreases toward the downstream side of the flow of premixed gas. Thus, according to the present configuration, premixed gas can be supplied in the inner circumferential direction of the combustion liner.

That is, according to the present configuration, the region where combustion occurs can move from a low-flow-rate region, where combustion conventionally occurs, near the inner wall surface of the combustion liner to a high-flow-rate region apart from the inner wall surface. Thus, premixed gas can easily move further toward the downward side, and therefore, a combustion region moves toward the downstream side relative to a conventional position. As a result, a high-temperature region and the region where heat is generated by combustion entirely move further toward the downstream side as compared to a conventional case, and the high-temperature retention time of combustion gas is shortened. Moreover, the mixing length until combustion increases, and the concentration of fuel is uniformized. Thus, the highest flame temperature decreases. As a result, the amount of NOx generation decreases.

Since premixed gas is supplied in the inner circumferential direction of the combustion liner by the ring, the size of a high-temperature recirculation flow formed in the vicinity of the center axis of the combustion liner decreases. As a result, NOx generated in a recirculation region is reduced.

The recirculation flow is held (concentrated) further on the inner side of the combustion liner by the ring. Accordingly, the flow on the outer peripheral side of the recirculation flow accelerates, and the velocity gradient in the radial direction in the recirculation region and the outer periphery thereof increases. As a result, uniformization of premixed gas on the outer peripheral side is promoted until combustion. Thus, the highest flame temperature of combustion gas decreases, and the amount of NOx generation decreases.

With movement of the combustion region toward the downstream side, the high-temperature region and the heat generation region of the inner wall surface of the combustion liner move further toward the downstream side as compared to the conventional case. Thus, a high-temperature portion of the inner wall surface is reduced. Accordingly, the volume of air for cooling the inner wall surface can be reduced, and the volume of air used for combustion can be increased. As a result, the flame temperature decreases, and the amount of NOx generation decreases.

As described above, combustion of premixed gas in the vicinity of the inner wall surface of the combustion liner on the upstream side is reduced, and the size of the high-temperature recirculation flow formed in the vicinity of the center axis of the combustion liner is reduced. Thus, combustion flame which can further reduce the amount of NOx generation can be realized.

In the above-described first aspect, the outer diameter of the ring preferably decreases toward an end portion of the ring.

According to the present configuration, flame holding at the end portion of the ring and damage of the ring can be prevented.

In the above-described first aspect, the inner diameter of the combustion liner increases from a step formed on the downstream side of the end portion of the ring, and air is discharged to the vicinity of the step through an air flow path formed in the clearance between the ring and the combustion liner.

According to the present configuration, the inner diameter of the combustion liner increases from the step formed on the downstream side of the end portion of the ring. Thus, there is a probability that combustion flame causes backfire in the vicinity of the step. For this reason, in the present configuration, air is discharged to the vicinity of the step through the air flow path formed in the clearance between the ring and the combustion liner, thereby reducing backfire. In addition, since the ring is convection-cooled by air flowing through the air flow path, the temperature of the ring further decreases. This reduces backfire in the vicinity of the ring.

In the above-described first aspect, a discharge hole through which air is discharged from the inner wall surface of the combustion liner is preferably formed on the downstream side of the step of the combustion liner.

According to the present configuration, cooling is performed for the downstream side of the step of the combustion liner, and flame holding on the downstream side of the step is prevented.

In the above-described first aspect, an acoustic box where a resonant space is formed with a plurality of holes penetrating the combustion liner in the circumferential direction is preferably provided in the step of the combustion liner.

According to the present configuration, since cooling is performed for the step of the combustion liner, and an acoustic attenuation effect is provided to the step of the combustion liner, pressure fluctuation in the combustion region is reduced. Moreover, according to the present configuration, since the acoustic box is provided in the step, a free space can be effectively utilized, and therefore, the acoustic box is no longer required at the outer periphery of the combustion liner.

In the above-described first aspect, the air flow path provides a swirling component to circulating air.

According to the present configuration, circulating air is provided with the swirling component forward in the swirling direction of premixed gas, and therefore, the inner wall surface of the combustion liner is cooled. On the other hand, circulating air is provided with the swirling component backward in the swirling direction of premixed gas, and this suppresses combustion flame from reaching the inner wall surface of the combustion liner.

In the above-described first aspect, the inner diameter of the combustion liner gradually increases on the downstream side of the end portion of the ring.

According to the present configuration, the low-flow-rate region formed in the vicinity of the inner wall surface of the combustion liner can be eliminated. Thus, the region where combustion occurs can move to the high-flow-rate region apart from the inner wall surface of the combustion liner, and the combustion region moves toward the downstream side relative to the conventional position. As a result, since the high-temperature region and the region where heat is generated by combustion move toward the downstream side, the highest flame temperature decreases due to a decrease in the high-temperature retention time of combustion gas and an increase in mixing length until combustion. This decreases the amount of NOx generation.

In the first aspect, a discharge hole through which air is discharged to the inner wall surface of the combustion liner is formed in the region where the inner diameter of the combustion liner increases.

According to the present configuration, combustion in the region where the inner diameter of the combustion liner increases can be reduced.

In the first aspect, in the region where the inner diameter of the combustion liner increases, the acoustic box where the resonant space is formed with the plurality of holes penetrating the combustion liner in the circumferential direction is provided.

According to the present configuration, a free space can be effectively utilized, and therefore, the acoustic box is no longer required at the outer periphery of the combustion liner.

The combustor of the first aspect preferably further includes a pilot cone covering around a tip end of the pilot nozzle. The tip end of the pilot nozzle is preferably positioned in the vicinity of an end portion of the pilot cone.

According to the present configuration, since the pilot nozzle is disposed further on the downstream side as compared to the conventional case. Thus, the low-flow-rate region formed due to recirculation of premixed gas of pilot fuel and air is reduced, and NOx generation due to the recirculation flow is reduced. Moreover, since the base portion where pilot flame holding occurs moves further to the downstream side, combustion flame moves further to the downstream side, and the amount of NOx generation is reduced.

A gas turbine of a second aspect of the present invention includes a compressor configured to compress air into compressed air; the above-described combustor configured to inject fuel to the compressed air introduced from the compressor to generate combustion gas; and a turbine rotatably driven by the combustion gas generated at the combustor.

Advantageous Effects of Invention

According to the present invention, an excellent effect is exhibited, which realizes combustion flame which can further reduce the amount of NOx generation.

DESCRIPTION OF EMBODIMENTS

An embodiment of a combustor and a gas turbine of the present invention will be described below with reference to drawings.

First Embodiment

A first embodiment of the present invention will be described below.

Figure 1:
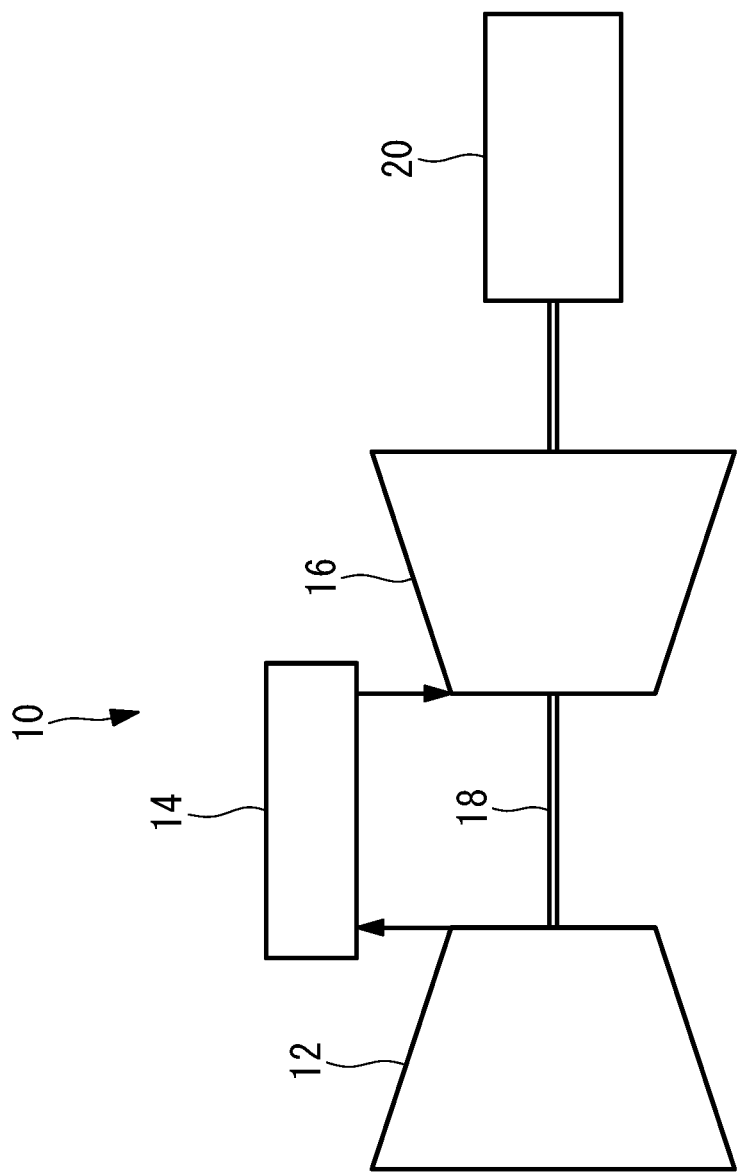
FIG. 1 is a configuration diagram of a gas turbine of a first embodiment of the present invention.

FIG. 1 is a configuration diagram of a gas turbine 10 including a combustor according to the first embodiment.

The gas turbine 10 includes a compressor 12, a combustor 14, and a turbine 16.

The compressor 12 is driven by a rotary shaft 18 to compress taken air into compressed air.

The combustor 14 is a premixed gas combustor, and is configured to inject the compressed air, introduced from the compressor 12, into fuel to combust such air, thereby generating high-temperature high-pressure combustion gas.

The turbine 16 is rotatably driven by the combustion gas generated at the combustor 14.

The turbine 16, the compressor 12, and a generator 20 are connected together through the rotary shaft 18, and the rotary drive force generated at the turbine 16 is transmitted to the compressor 12 and the generator 20 through the rotary shaft 18. Then, the generator 20 generates power using the rotary drive force of the turbine 16.

Figure 2:
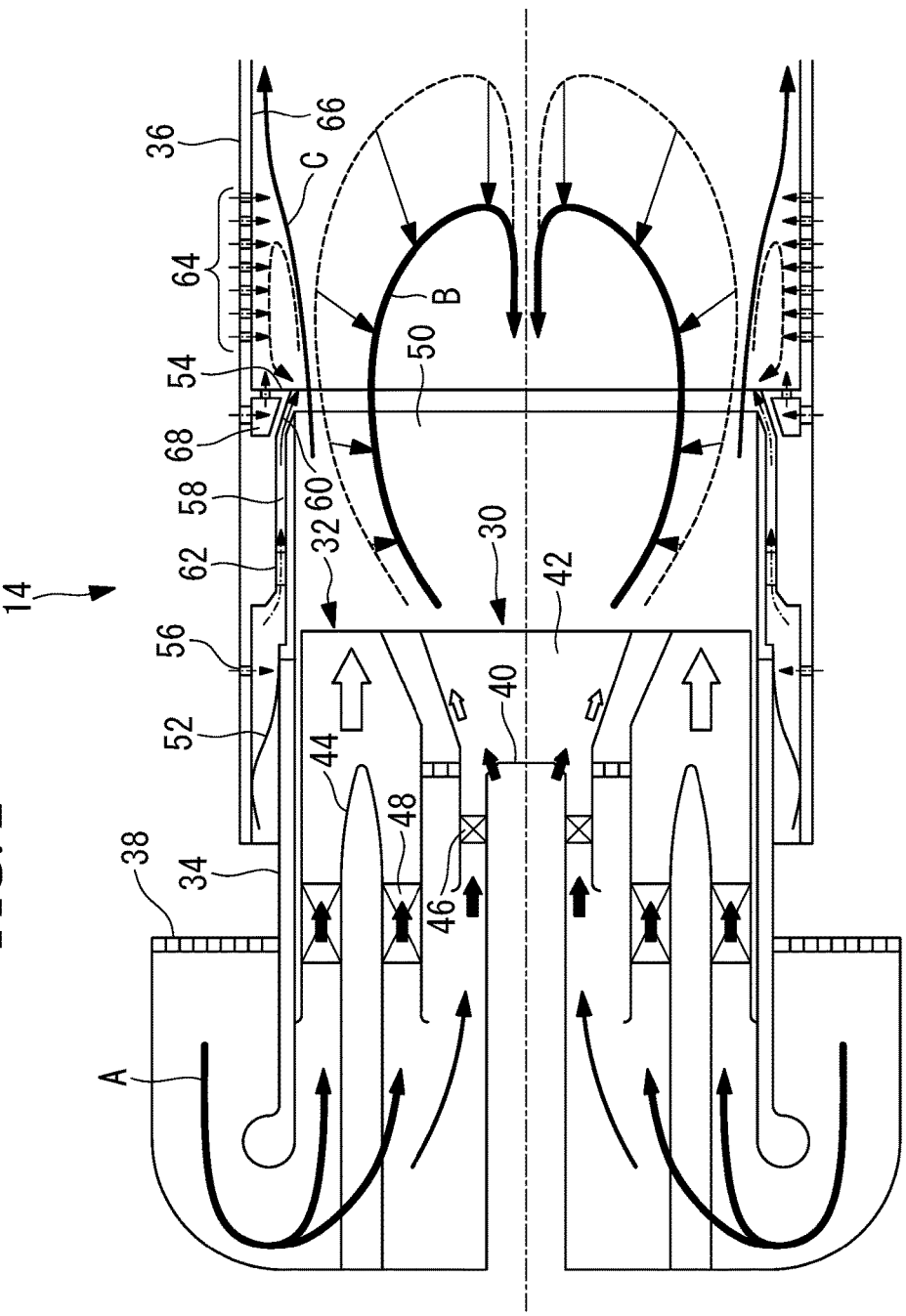
FIG. 2 is a longitudinal sectional view of a combustor of the first embodiment of the present invention.

FIG. 2 is a longitudinal sectional view of the combustor 14 of the present embodiment.

The combustor 14 includes a pilot burner 30, main burners 32, a combustor basket 34, and a combustion liner (also called a "tail covert") 36. Note that air compressed at the compressor 12 is guided to the outer peripheral side of the combustor 14. While the compressed air to be guided to the pilot burner 30 and the main burners 32 in the combustor 14 is guided from the outer peripheral side of the combustor 14 toward an air inlet port 38, such compressed air is supplied into the combustor 14. The compressed air turns at a right end portion as indicated by arrows A of FIG. 1, and then, flows from the left to the right.

The pilot burner 30 is configured such that a pilot nozzle 40 is disposed along the center axis of the combustor 14, and injects fuel to perform combustion in a combustion region.

At a tip end of the pilot nozzle 40, a pilot cone 42 is provided so as to cover around the tip end of the pilot nozzle 40. The pilot cone 42 is formed substantially in such a funnel shape that the diameter thereof increases toward the downstream side of flow. The pilot cone 42 prevents an air-fuel mixture injected from the pilot nozzle 40 and combustion flame thereof from spreading in the centrifugal direction, and therefore, prevents interference with an air-fuel mixture from main nozzles 44.

Further, a plurality of blade-shaped pilot swirl vanes 46 are arranged at the outer periphery of the pilot nozzle 40. A pitch angle is provided such that the pilot swirl vanes 46 are inclined in the same direction. Thus, the flow of compressed air generates a spiral flow (a swirling flow), and therefore, promotes mixing of the compressed air with injected pilot fuel.

The main burners 32 are arranged at regular intervals in the circumferential direction on the outer peripheral side of the pilot nozzle 40, and inject main fuel. Then, the main fuel and the compressed air are mixed together to perform premix combustion.

In addition, each main nozzle 44 is provided at a corresponding one of the main burners 32. A plurality of main swirl vanes 48 protruding toward the main burner 32 are arranged on each main nozzle 44. At each main swirl vane 48, a plurality of injection holes through which the main fuel is injected are formed. Since a pitch angle is provided such that the main swirl vanes 48 are inclined in the same direction, a spiral flow (a swirling flow) is, in the same rotation direction, generated with the flow of the mixture of the main fuel and the compressed air, and therefore, mixing is promoted.

The combustor basket 34 is substantially coaxial with the pilot nozzle 40, and is formed so as to entirely cover the pilot nozzle 40 and the main nozzles 44. Moreover, an outlet outer ring (a ring) 50 opening on the fuel gas downstream side and guiding premixed gas toward the downstream side is provided at a tip end of the combustor basket 34.

The combustion liner 36 is, at an inner surface thereof, fitted onto the outer periphery of the combustor basket 34 by a spring clip 52, and surrounds the outlet outer ring 50. Moreover, the combustion liner 36 guides, to the turbine 16, the combustion gas generated by the pilot nozzle 40 and the main nozzles 44.

Note that the outlet outer ring 50 of the first embodiment is in a cylindrical shape extending parallel to a wall surface of the combustion liner 36 and having a constant diameter in the direction of axis. Thus, the inner diameter of the combustion liner 36 increases from a step 54 on the downstream side of an end portion of the outlet outer ring 50.

An air intake port 56 through which part of the compressed air is taken is formed at the combustion liner 36. Part of the compressed air taken through the air intake port 56 flows through an air flow path 58 formed in the clearance between the outlet outer ring 50 and the combustion liner 36, and then, is discharged through an air discharge hole 60 formed near the step 54. Note that a spacer 62 configured to maintain the cross-sectional area of the air flow path 58 is provided at the air flow path 58.

Figure 3A:
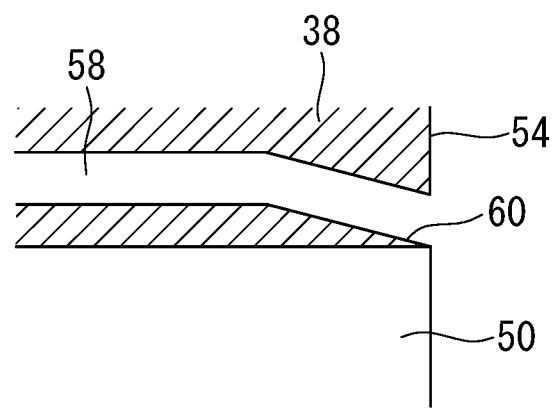
FIG. 3A is an enlarged partial view of an end portion of an outlet outer ring of the first embodiment of the present invention.

As illustrated in FIG. 3A, the air discharge hole 60 is inclined to the center axis of the combustion liner 36. In this configuration, the outer diameter of the outlet outer ring 50 decreases toward the end portion thereof.

Film air discharge holes 64 are formed on the downstream side of the step 54 at the combustion liner 36. The film air discharge holes 64 discharge, as film air, part of the compressed air guided to the outside of the combustor 14 through an inner wall surface 66, thereby performing film cooling for the inner wall surface 66.

Further, an acoustic box (also called an "acoustic liner") 68 where a resonant space is formed with a plurality of holes penetrating the combustion liner 36 in the circumferential direction is provided in the step 54 of the combustion liner 36.

Next, the process of combustion at the combustor 14 configured as described above will be described.

First, air compressed at the compressor 12 flows into the combustion liner 36, and then, flows through the pilot burner 30 and the main burners 32 from the upstream side toward the downstream side in the direction indicated by the arrows A.

In the pilot burner 30, the compressed air whose swirling flow is generated by the swirl vanes 46 and pilot fuel injected from the pilot nozzle 40 are mixed into premixed gas. The premixed gas is injected from the pilot cone 42 toward the combustion region. The premixed gas is ignited by a not-shown pilot light, and combustion is performed on the downstream side and the inside of the pilot cone 42.

Meanwhile, in each main burner 32, the compressed air whose swirling flow is generated by the main swirl vanes 48 when the compressed air flows along the main nozzle 44 and main fuel injected from the main swirl vanes 48 are mixed into premixed gas. The premixed gas is injected from the main burner 32 toward the combustion region. The premixed gas is ignited and combusted by contacting the combustion gas (the flame) of the combusting premixed gas injected from the pilot cone 42.

The turbine 16 of the gas turbine 10 is driven by the expansion pressure of the combustion gas of the premixed gas combusted as described above, and then, such drive force is taken out as output. Meanwhile, the compressor 12 provided coaxially with a main shaft of the turbine 16 is driven to supply compressed air into the combustor 14.

Note that as illustrated in FIG. 2, the combustion gas circulates (a recirculation flow) from the downstream side toward the upstream side in the combustion region as indicated by arrows B. The recirculation flow is preferable for stable combustion of combustion gas, but the retention time of the combustion gas increases accordingly. For this reason, a less recirculation flow is preferable in order to reduce the amount of NOx generation.

Moreover, for mixing and flame holding, the premixed gas of main fuel and air generates a swirling flow. For this reason, such premixed gas tends to flow and combust on the inner wall surface side of the combustion liner 36 as indicated by arrows C of FIG. 2, and therefore, the temperature of the inner wall surface 66 of the combustion liner 36 increases. Thus, this is not preferable.

For the above-described reason, the combustor 14 of the first embodiment is formed such that the outlet outer ring 50 is not in a conventional conical shape (a tapered shape) but in the shape parallel to the inner wall surface 66 of the combustion liner 36. Thus, the combustor 14 can supply the premixed gas in the inner circumferential direction of the combustion liner 36.

That is, the combustor 14 of the first embodiment can move the region where combustion occurs from a low-flow-rate region, where combustion conventionally occurs, near the inner wall surface 66 of the combustion liner 36 to a high-flow-rate region apart from the inner wall surface 66. Thus, the premixed gas can easily move further toward the downward side, and therefore, the combustion region moves further toward the downstream side relative to a conventional position. As a result, the high-temperature region and the region where heat is generated by combustion entirely move further toward the downstream side as compared to a conventional case, and the high-temperature retention time of combustion gas is shortened. Moreover, the mixing length until combustion increases, and the concentration of fuel is uniformized. Thus, the highest flame temperature decreases. As a result, the amount of NOx generation decreases.

Since the premixed gas is supplied in the inner circumferential direction of the combustion liner 36 by the outlet outer ring 50, the size of the high-temperature recirculation flow (see the arrows B) formed in the vicinity of the center axis of the combustion liner 36 decreases. As a result, NOx generated in a recirculation region is reduced.

The recirculation flow is held (concentrated) further on the inner side of the combustion liner 36 by the outlet outer ring 50. Accordingly, the flow on the outer peripheral side of the recirculation flow accelerates, and the velocity gradient in the radial direction in the recirculation region and the outer periphery thereof increases. As a result, uniformization of premixed gas on the outer peripheral side is promoted until combustion. Thus, the highest flame temperature of combustion gas decreases, and the amount of NOx generation decreases.

With movement of the combustion region toward the downstream side, the high-temperature region and the heat generation region of the inner wall surface 66 of the combustion liner 36 move further toward the downstream side as compared to the conventional case. Thus, a high-temperature portion of the inner wall surface 66 is reduced. Accordingly, the volume of air for cooling the inner wall surface 66 can be reduced, and the volume of air used for combustion can be increased. As a result, the flame temperature decreases, and the amount of NOx generation decreases.

As described above, the outer diameter of the outlet outer ring 50 decreases toward the end portion of the outlet outer ring 50.

Figure 3B:
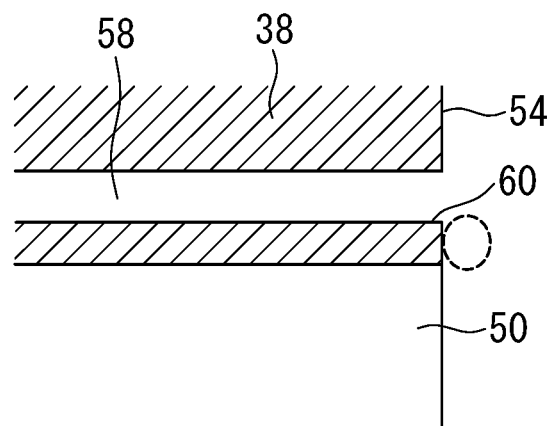
FIG. 3B is an enlarged partial view of the end portion of the outlet outer ring illustrating the shape at which the outer diameter of the outlet outer ring does not decrease.

FIG. 3B illustrates the shape in which the outer diameter of the outlet outer ring 50 does not decrease. As illustrated in FIG. 3B, in the shape in which the outer diameter does not decrease, flame holding occurs in the vicinity (the region indicated by a dashed line in FIG. 3B) of the end portion of the outlet outer ring 50, and therefore, there is a probability that the outlet outer ring 50 is damaged.

On the other hand, a decrease in the outer diameter of the outlet outer ring 50 can prevent flame holding at the end portion and damage of the outlet outer ring 50.

The combustor 14 of the first embodiment includes the step 54 as described above. Thus, there is a probability that combustion flame causes backfire in the vicinity of the step 54. For this reason, in the combustor 14 of the first embodiment, air is discharged to the vicinity of the step 54 through the air flow path 58 formed in the clearance between the outlet outer ring 50 and the combustion liner 36, thereby forcibly forming a flow in the vicinity of the step 54 to reduce backfire.

Figure 10:
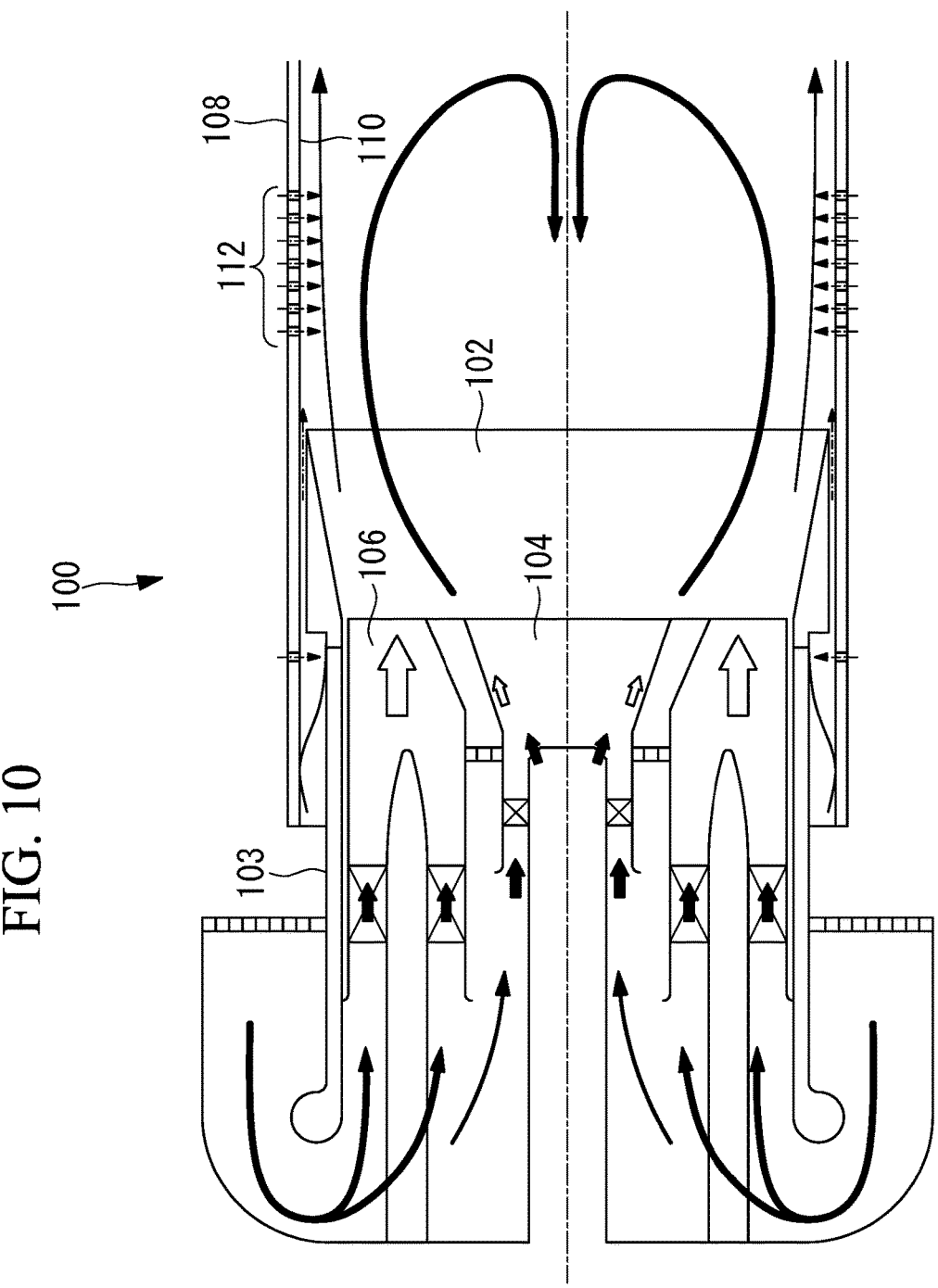
FIG. 10 is a longitudinal sectional view of a conventional combustor.

Moreover, the thickness of the outlet outer ring 50 is less as compared to the conventional case (see the outlet outer ring 102 of FIG. 10). Thus, the outlet outer ring 50 can be easily convection-cooled by air flowing through the air flow path 58. Since the outlet outer ring 50 is convection-cooled as described above, the temperature of the outlet outer ring 50 further decreases, and therefore, backfire in the vicinity of the outlet outer ring 50 is reduced.

Air discharged through the film air discharge holes 64 forms a thin air layer along the inner peripheral wall surface of the combustion liner 36, thereby cooling the combustion liner 36 to prevent burnout of the wall surface.

Since the acoustic box 68 takes part of the compressed air and discharges such air to the step 54, the step 54 of the combustion liner 36 is cooled. Moreover, since the acoustic box 68 provides an acoustic attenuation effect, and pressure fluctuation in the combustion region is reduced. Moreover, since the acoustic box 68 is provided in the step 54, the combustor 14 effectively utilizes a free space, and therefore, the acoustic box 68 is no longer required at the outer periphery of the combustion liner 36.

Further, since the air discharge hole 60, the acoustic box 68, and the film air discharge holes 64 supply air to the vicinity of the inner wall surface 66 of the combustion liner 36, the fuel concentration around the premixed gas decreases, and the combustion temperature at the inner wall surface 66 of the combustion liner 36 decreases.

Figure 4:
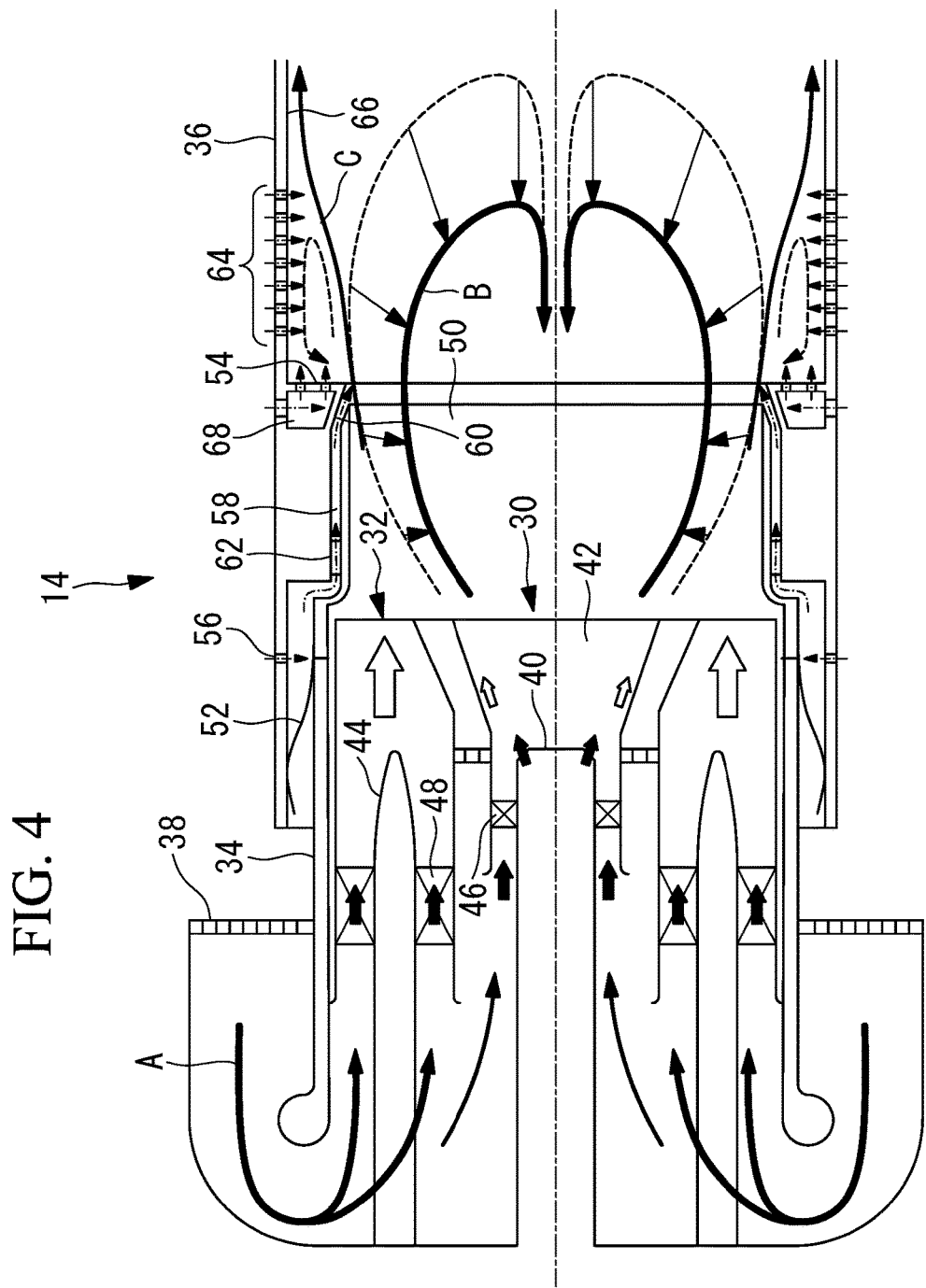
FIG. 4 is a longitudinal sectional view of a combustor of a variation of the first embodiment of the present invention.

FIG. 4 is a variation of the combustor 14 of the first embodiment.

The outlet outer ring 50 provided at the combustor 14 illustrated in FIG. 4 is formed such that the inner diameter thereof decreases toward the downstream side of the flow of premixed gas. The outlet outer ring 50 illustrated in FIG. 4 includes a step on the downstream side of the positions where the main burners 32 and the pilot burner 30 are provided, and therefore, the inner diameter of the outlet outer ring 50 decreases. Note that the present invention is not limited to this configuration, and the outlet outer ring 50 may be in such an inverted tapered shape that the inner diameter thereof gradually decreases.

The air flow path 58 may provide a swirling component to circulating air.

More specifically, the spacer 62 provided at the air flow path 58 is formed in, e.g., a guide vane shape, and therefore, the swirling component is provided to circulating air.

For example, a swirling component is provided, to the air circulating through the air flow path 58, forward in the swirling direction of premixed gas of main fuel. This enhances the film cooling effect provided by the air circulating through the air flow path 58, and therefore, further cools the inner wall surface 66 of the combustion liner 36. On the other hand, when a swirling component is provided, to the air circulating through the air flow path 58, backward in the swirling direction of premixed gas of main fuel, the swirling component is moderated, thereby suppressing combustion flame from reaching the inner wall surface 66 of the combustion liner 36.

As described above, the combustor 14 of the first embodiment includes the pilot nozzle 40, the main nozzles 44 spaced from the pilot nozzle 40 in the circumferential direction on the outer peripheral side of the pilot nozzle 40 and configured to perform premixed gas combustion, the combustor basket 34 surrounding the pilot nozzle 40 and the main nozzles 44, the outlet outer ring 50 provided at the tip end of the combustor basket 34, and the combustion liner 36 fitted, at the inner surface thereof, onto the outer periphery of the combustor basket 34 and surrounding the outlet outer ring 50. Moreover, the outlet outer ring 50 is formed parallel to the inner wall surface 66 of the combustion liner 36.

Thus, the combustor 14 of the first embodiment reduces combustion of premixed gas in the vicinity of the inner wall surface 66 of the combustion liner 36 on the upstream side, and reduces the size of the high-temperature recirculation flow formed in the vicinity of the center axis of the combustion liner 36. Thus, combustion flame can be provided with a reduced amount of NOx generation.

Second Embodiment

A second embodiment of the present invention will be described below.

Figure 5:
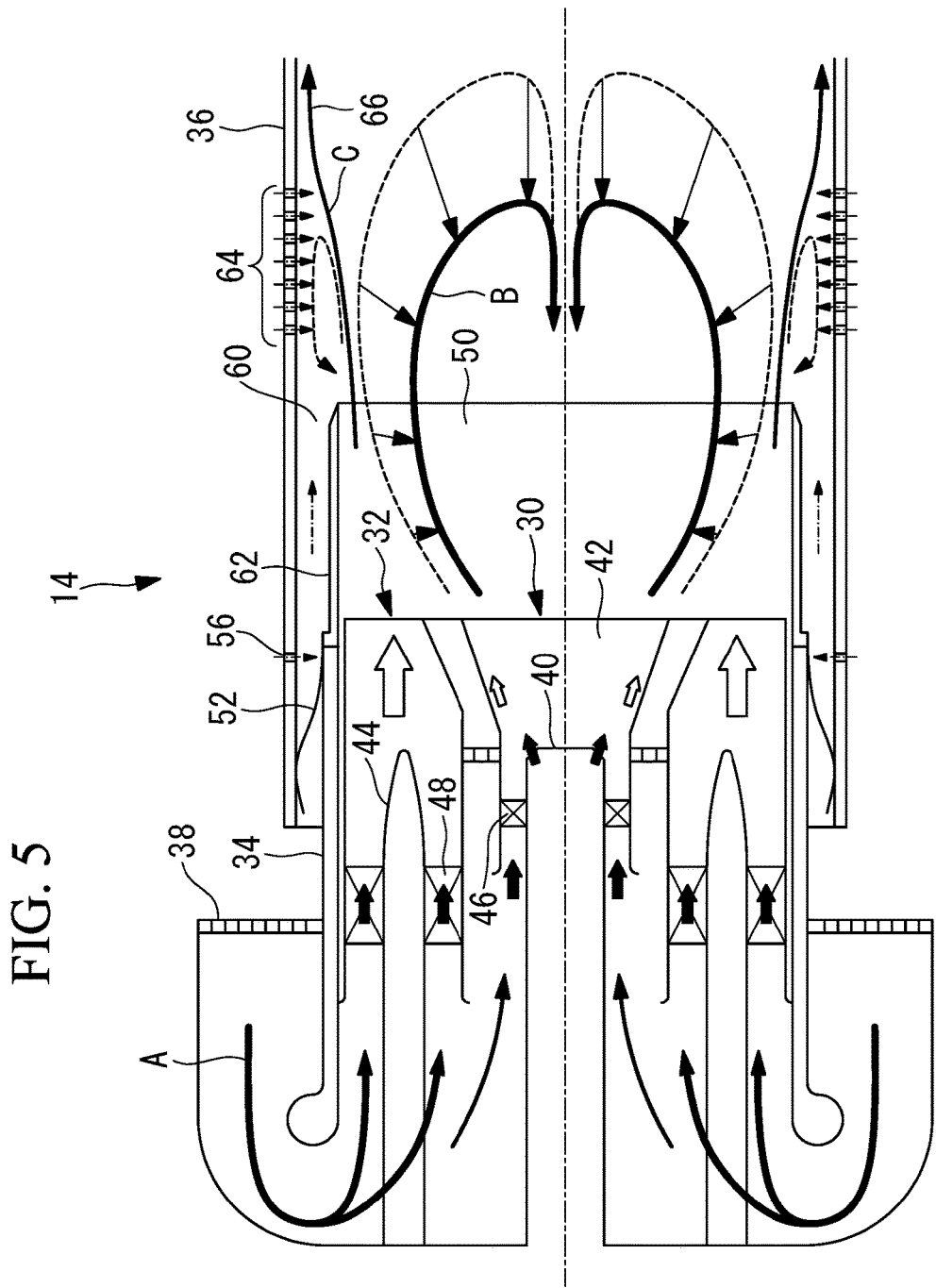
FIG. 5 is a longitudinal sectional view of a combustor of a second embodiment of the present invention.

FIG. 5 illustrates the configuration of a combustor 14 of the second embodiment. Note that the same reference numerals as those shown in FIG. 2 are used to represent, in FIG. 5, the same elements as those illustrated in FIG. 2, and the description thereof will not be repeated.

A combustion liner 36 provided at the combustor 14 of the second embodiment is configured such that the inner diameter thereof is constant from the region where the combustion liner 36 is fitted onto the outer periphery of a combustor basket 34 to a combustion region.

Since the configuration of the combustion liner 36 of the combustor 14 of the second embodiment is simplified, the workability of the combustor 14 is improved, and a cost is reduced.

Figure 6:
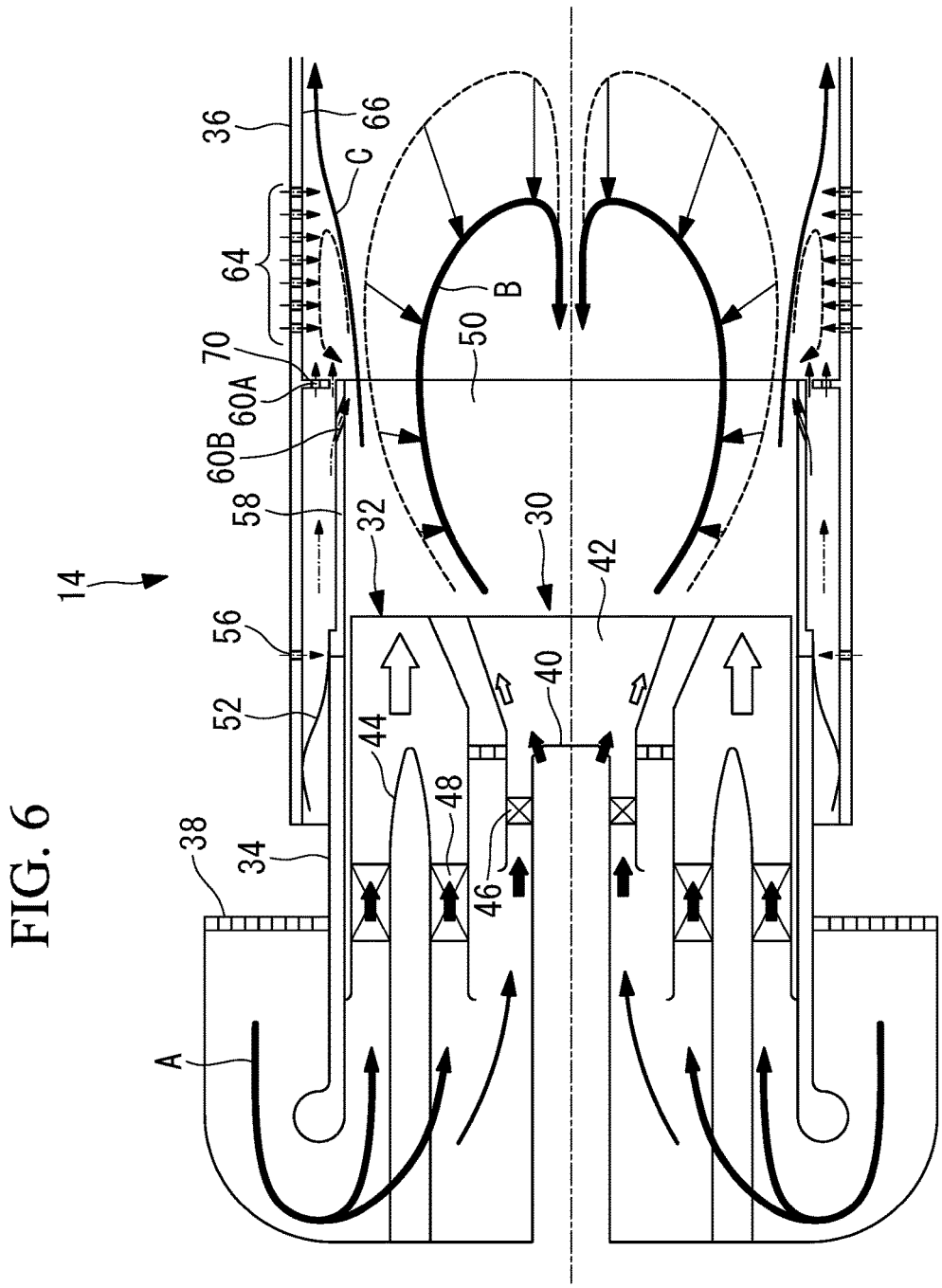
FIG. 6 is a longitudinal sectional view of a combustor of a variation of the second embodiment of the present invention.

FIG. 6 illustrates the configuration of a combustor 14 of a variation of the second embodiment.

The combustor 14 illustrated in FIG. 6 is configured such that a vertical ring 70 serving as a restriction member configured to restrict the volume of air flowing through the air flow path 58 is provided at the downstream end portion of the air flow path 58. The vertical ring 70 is in such a circular ring shape that an outlet of the air flow path 58 is closed off. At the vertical ring 70, an air discharge hole 60A through which air for cooling the inner wall surface 66 of the combustion liner 36 is discharged is provided.

Since the vertical ring 70 is provided at the combustor 14 illustrated in FIG. 6, the volume of air flowing through the air flow path 58 can be controlled, and backfire of combustion flame toward the upstream side of the air flow path 58 can be prevented.

An air discharge hole 60B through which air is discharged from the air flow path 58 may be provided in the vicinity of the end portion of the outlet outer ring 50. The end portion of the outlet outer ring 50 is cooled by the air discharged through the air discharge hole 60B.

Figure 7:
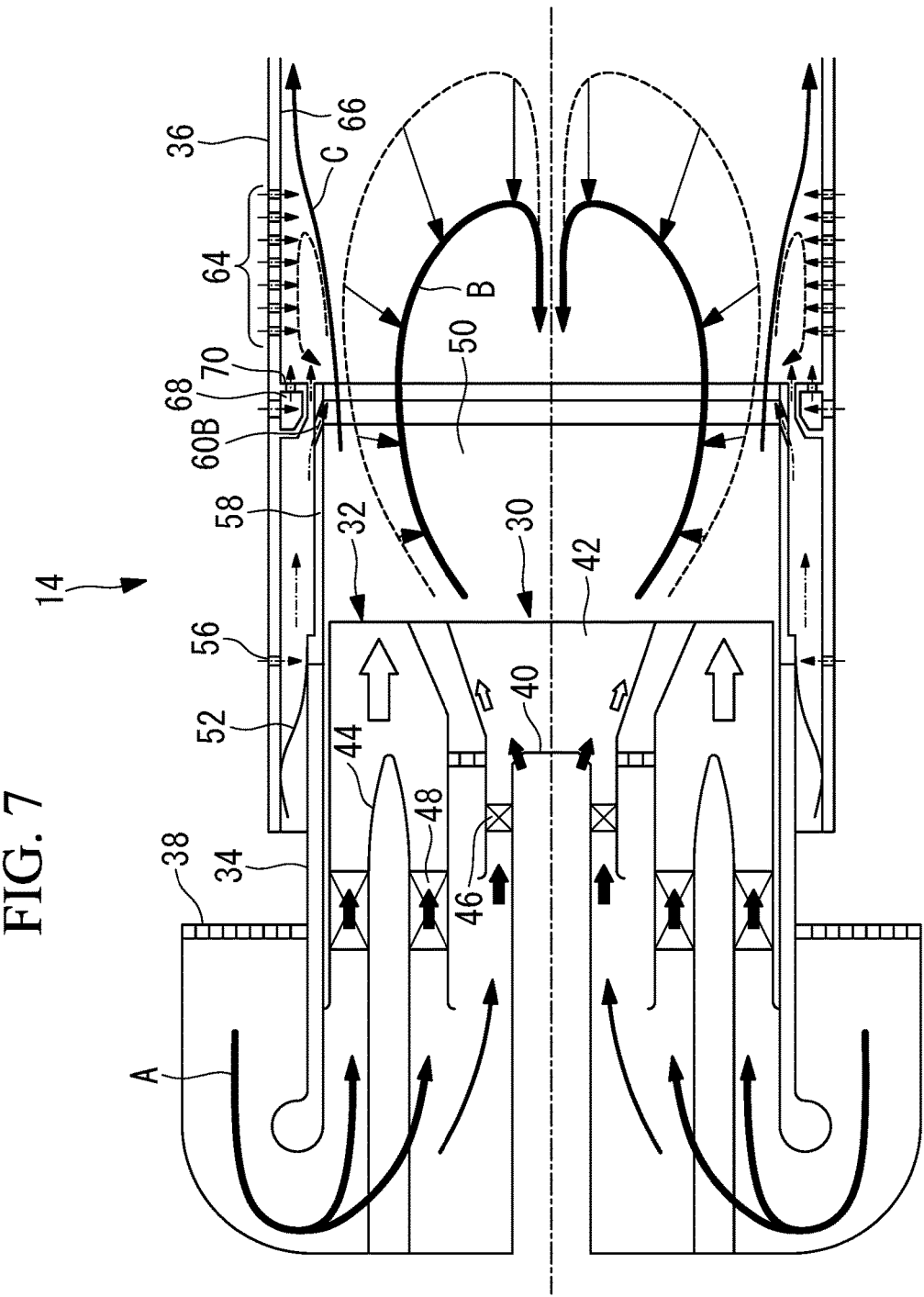
FIG. 7 is a longitudinal sectional view of a combustor of another variation of the second embodiment of the present invention.

FIG. 7 illustrates the configuration of a combustor 14 of another variation of the second embodiment.

The combustor 14 illustrated in FIG. 7 is configured such that an acoustic box 68 also serving as the air discharge hole 60A is provided at the vertical ring 70. Thus, the combustor 14 effectively utilizes a free space, and therefore, the acoustic box 68 is no longer required at the outer periphery of the combustion liner 36.

Third Embodiment

A third embodiment of the present invention will be described below.

Figure 8:
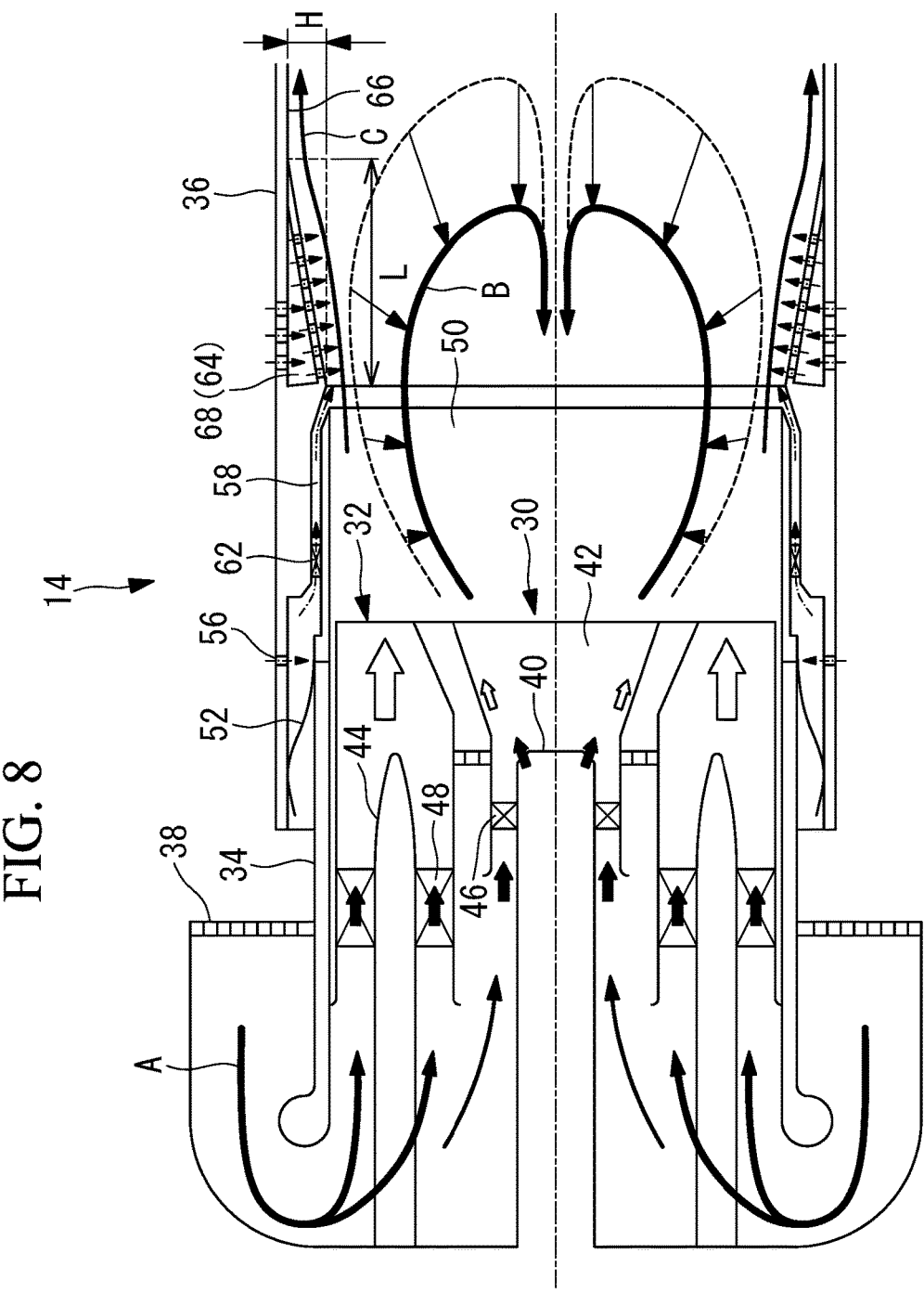
FIG. 8 is a longitudinal sectional view of a combustor of a third embodiment of the present invention.

FIG. 8 illustrates the configuration of a combustor 14 of the third embodiment. Note that the same reference numerals as those shown in FIG. 2 are used to represent, in FIG. 8, the same elements as those illustrated in FIG. 2, and the description thereof will not be repeated.

A combustion liner 36 provided at the combustor 14 of the third embodiment is configured such that the inner diameter thereof gradually increases toward the downstream side relative to the end portion of an outlet outer ring 50. That is, the combustion liner 36 is in a cone shape (a conical shape) on the downstream side relative to the end portion of the outlet outer ring 50.

In the region where the inner diameter of the combustion liner 36 increases, film air discharge holes 64 and an acoustic box 68 are provided. Note that in the third embodiment, a plurality of discharge holes through which compressed air is taken and discharged are formed at the acoustic box 68, and therefore, the acoustic box 68 also serves as the film air discharge holes 64. Note that the shape of the acoustic box 68 illustrated in FIG. 8 is an example, and the present invention is not limited to such a shape.

The combustor 14 of the third embodiment can eliminate a low-flow-rate region formed in the vicinity of an inner wall surface 66 of the combustion liner 36. Thus, the region where combustion occurs can move to a high-flow-rate region apart from the inner wall surface 66 of the combustion liner 36, and a combustion region moves toward the downstream side relative to a conventional position. As a result, since the region where heat is generated by combustion and a high-temperature region move toward the downstream side, the highest flame temperature decreases due to a decrease in the high-temperature retention time of combustion gas and an increase in mixing length until combustion. This decreases the amount of NOx generation.

The inclination angle of the increasing inner diameter of the combustion liner 36 relative to the center axis of the combustion liner 36 is preferably an angle at which air does not separate from the inner wall surface 66 of the combustion liner 36, such as a range of 7 to 45 degrees. That is, as illustrated in FIG. 8, the relationship between an axial length L and a protrusion length H satisfies L=1 to 8H.

In the case of the axial length L being longer as in, e.g., L=8H, backfire is further reduced, and therefore, air for cooling film air etc. can be reduced.

Fourth Embodiment

A fourth embodiment of the present invention will be described below.

Figure 9:
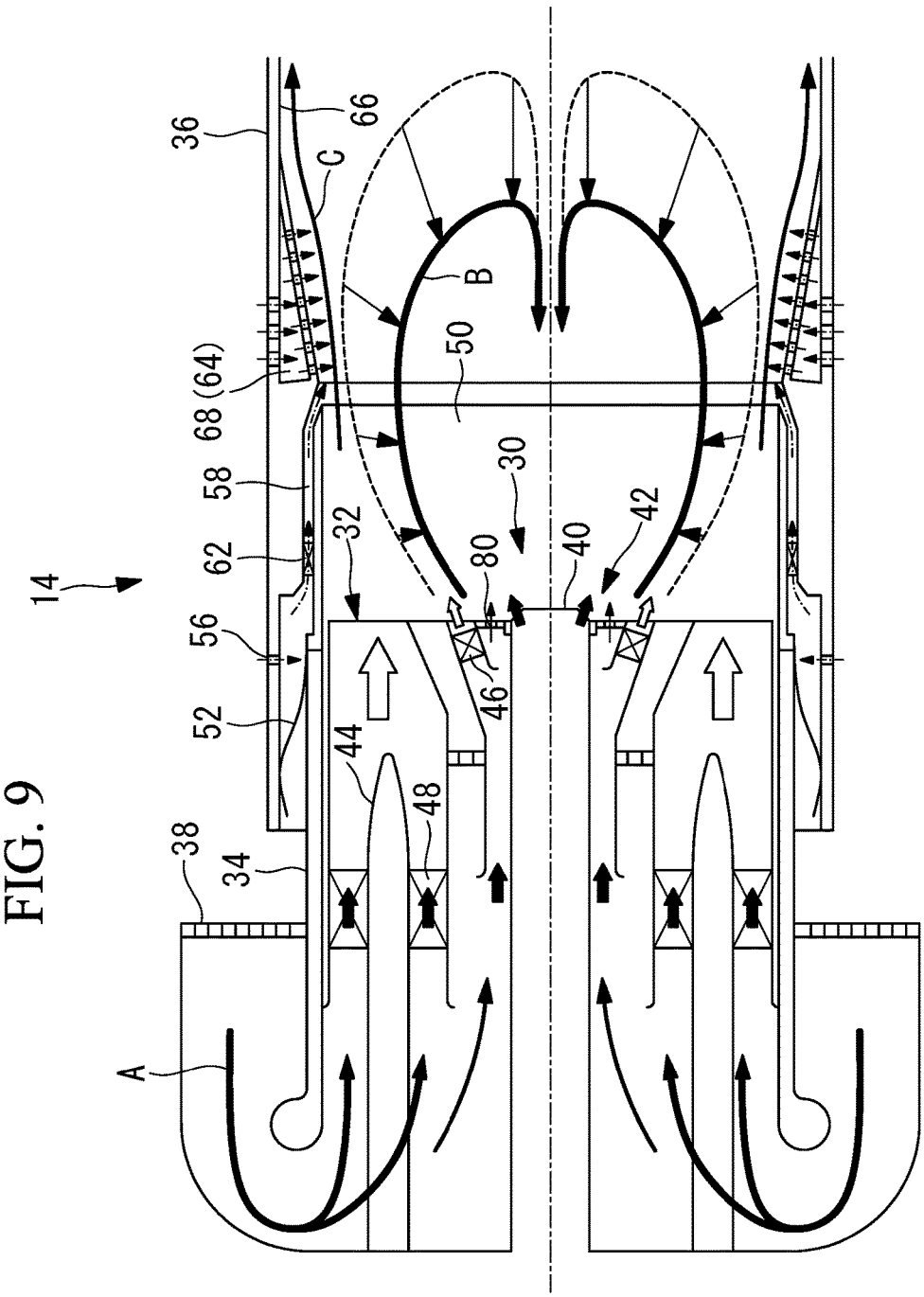
FIG. 9 is a longitudinal sectional view of a combustor of a fourth embodiment of the present invention.

FIG. 9 illustrates the configuration of a combustor 14 of the fourth embodiment. Note that the same reference numerals as those shown in FIG. 2 are used to represent, in FIG. 9, the same elements as those illustrated in FIG. 8, and the description thereof will not be repeated.

A tip end of a pilot nozzle 40 provided at the combustor 14 of the fourth embodiment is positioned in the vicinity of an end portion of a pilot cone 42.

Note that in the combustor 14 of the fourth embodiment, pilot swirl vanes 46 are also positioned in the vicinity of the end portion of the pilot cone 42, and a discharge hole 80 for compressed air is formed between the pilot nozzle 40 and each pilot swirl vane 46. The space between each pilot swirl vane 46 and the pilot nozzle 40 is cooled by the air discharged through the discharge hole 80 for compressed air.

In the combustor 14 of the fourth embodiment, the step (the recessed region) formed in a conventional configuration, i.e., the step between the end portion of the pilot cone 42 and the tip end of the pilot nozzle 40, becomes smaller, and the pilot nozzle 40 is disposed further on the downstream side as compared to the conventional configuration.

Thus, in the combustor 14 of the fourth embodiment, a low-flow-rate region formed due to recirculation of premixed gas of pilot fuel and compressed air is reduced, and NOx generation due to a recirculation flow is reduced. Moreover, since the base portion where pilot flame holding occurs moves further to the downstream side, combustion flame moves further to the downstream side, and the amount of NOx generation is reduced.

Note that in the fourth embodiment, the case where the present invention is applied to the combustor 14 of the third embodiment has been described, but the present invention is not limited to such a case. The present invention may be applied to the first or second embodiment.

The present invention has been described above with reference to each of the above-described embodiments, but the technical scope of the present invention is not limited to the scope described in the above-described embodiments. Various changes and modifications can be made to each of the above-described embodiments without departing from the gist of the present invention, and the technical scope of the present invention includes the embodiments to which the changes and modifications have been made.

REFERENCE SIGNS LIST 10 gas turbine
12 compressor
14 combustor
16 turbine 34 combustor basket
36 combustion liner
40 pilot nozzle
44 main nozzle
50 outlet outer ring
54 step
58 air flow path
64 film air discharge hole
68 acoustic box

The invention claimed is:

1. A combustor comprising:
a pilot nozzle;
a plurality of main nozzles arranged apart from the pilot nozzle in a circumferential direction on an outer peripheral side of the pilot nozzle and configured to perform premix combustion;
a combustor basket surrounding the pilot nozzle and each main nozzle;
a ring provided at a tip end of the combustor basket; and
a combustion liner, an inner surface of which is fitted onto an outer periphery of the combustor basket and surrounds the ring,
wherein the ring is formed such that an inner wall surface thereof is parallel to an inner wall surface of the combustion liner, or is formed such that an inner diameter thereof decreases toward a downstream side of a flow of premixed gas,
wherein an outer diameter of the ring decreases toward an end portion of the ring, the end portion located at the downstream side of the flow of the premixed gas.

2. The combustor of claim 1, wherein
an inner diameter of the combustion liner increases from a step formed on a downstream side of the end portion of the ring, and
air is discharged to a vicinity of the step through an air flow path formed in a clearance between the ring and the combustion liner.

3. The combustor of claim 2, wherein
a discharge hole through which air is discharged from the inner wall surface of the combustion liner is formed on a downstream side of the step of the combustion liner.

4. The combustor of claim 2, wherein
an acoustic box where a resonant space is formed with a plurality of holes penetrating the combustion liner in the circumferential direction is provided in the step of the combustion liner.

5. The combustor of claim 2, wherein
the air flow path provides a swirling component to circulating air.

6. The combustor of claim 1, wherein
an inner diameter of the combustion liner gradually increases on a downstream side of the end portion of the ring.

7. The combustor of claim 6, wherein
a discharge hole through which air is discharged to the inner wall surface of the combustion liner is formed in a region where the inner diameter of the combustion liner increases.

8. The combustor of claim 6, wherein
in a region where the inner diameter of the combustion liner increases, an acoustic box where a resonant space is formed with a plurality of holes penetrating the combustion liner in the circumferential direction is provided.

9. The combustor of claim 1, further comprising:
a pilot cone covering around a tip end of the pilot nozzle,
wherein the tip end of the pilot nozzle is positioned in a vicinity of an end portion of the pilot cone.

10. A gas turbine comprising:
a compressor configured to compress air into compressed air;
the combustor of claim 1 configured to inject fuel to the compressed air introduced from the compressor to generate combustion gas; and
a turbine rotatably driven by the combustion gas generated at the combustor.

* * * * *